Oct. 25, 1955  J. D. RICHARD, JR  2,721,987
SONIC ECHO RANGING

Filed Nov. 8, 1954  2 Sheets-Sheet 2

INVENTOR
Joseph D. Richard Jr.

United States Patent Office 2,721,987
Patented Oct. 25, 1955

2,721,987

SONIC ECHO RANGING

Joseph D. Richard, Jr., South Miami, Fla.

Application November 8, 1954, Serial No. 467,311

7 Claims. (Cl. 340—3)

The present invention relates to the field of sonic echo ranging. More specifically it relates to the method of underwater sonic echo ranging in which echoes from fish and other objects are displayed on a cathode ray tube. The present invention provides a method and means for triggering a delayed sweep in which the beginning of the sweep is related to distance above the bottom. The conventional delayed sweep is initiated a certain time interval after the transmitted pulse; the various ranges displayed on the sweep can therefore only be related to distance from the transmitting device.

In the past, a number of instruments have been in use for echo ranging underwater objects such as schools of fish even individual fish. In most of these instruments short pulses of high frequency acoustic energy are transmitted vertically into the water in a relatively narrow beam by means of a suitable transducer. An object such as a fish in the path of the beam scatters the sound and some of it is returned to the transducer where it is received and amplified. Since the sound has a known velocity of approximately 4800 feet per second in water the range of a given target can be related to the time elapsing between the transmission of a pulse and the receipt of the corresponding echo. In the more refined instruments of this type used in the past, means are provided for delaying the cathode ray tube display sweep so that the particular interval appearing on the display is determined by the delay elapsing between transmission of the outgoing pulse and the starting of the range sweep. In some instruments the sweep length is also adjustable. Any desired range interval can therefore be examined by adjusting the sweep delay and the sweep length control. Range markers, consisting of sharp pulses generated by a suitable timing circuit, are sometimes introduced into the display along with the echo signals at the proper time on each sweep. These range markers are synchronized with respect to the transmitted pulse.

An outstanding objection to the vertical echo ranging devices used in the past for locating fish is the lack of resolution and ability to integrate successive echoes on the cathode ray tube. If an individual fish, a few feet above the bottom, was being ranged, successive echoes of the fish displayed on the C. R. T. would not fall in the same position due to the fact that the range varies as the transmitting vessel moves up and down on the waves. The vertical movement of a vessel is nearly always greater than one foot and this is large compared to the vertical dimensions of the fish. If the object being ranged is just off the bottom both the bottom echo and the echo from the object move up and down so that the bottom echo obliterates the object echo of the preceding sweep. When a fast sweep is used to expand the region just above the bottom only the information from a single individual sweep actually gives a clear picture. A short persistence phosphor must therefore be used and the very short duration of the individual sweep is difficult to interpret. In the past, attempts to locate concentrations of shrimp (which are nearly always within one foot of the bottom) have been almost entirely unsuccessful for the above mentioned reasons.

Another outstanding objection to the fish locating echo ranging systems used in the past is the low pulse repetition rate used. It has been necessary to use low pulse repetition rates to avoid confusing multiple bottom echoes with fish echoes. It can be readily understood, for example, that the third or fourth reverberation between the surface and the bottom might be mistaken for a fish echo. This low pulse repetition rate means that a vessel moving vertically with the waves actually changes its range to an object between successive ranging pulses. This makes the use of a long persistence phosphor with adequate visual integrating properties impossible to use since it would result in a severe decrease in resolution.

An object of my invention is to provide a method and apparatus for substantially vertical underwater echo ranging which is devoid of the abovementioned disadvantages and difficulties and which is suitable for locating fish and concentrations of shrimp.

A further object of my invention is to provide a method for triggering a delayed C. R. T. sweep which is related to a range interval above the bottom. The advantages gained are due to the fact that fish maintain their position relative to the bottom for periods of time which are long compared to the pulse repetition period.

Another object of my invention is to provide a method whereby much higher pulse repetition rates may be used without interference from multiple bottom echoes.

Other objects and advantages will become more apparent from a study of the following specifications, taken together with the drawings in which.

Figure 1:
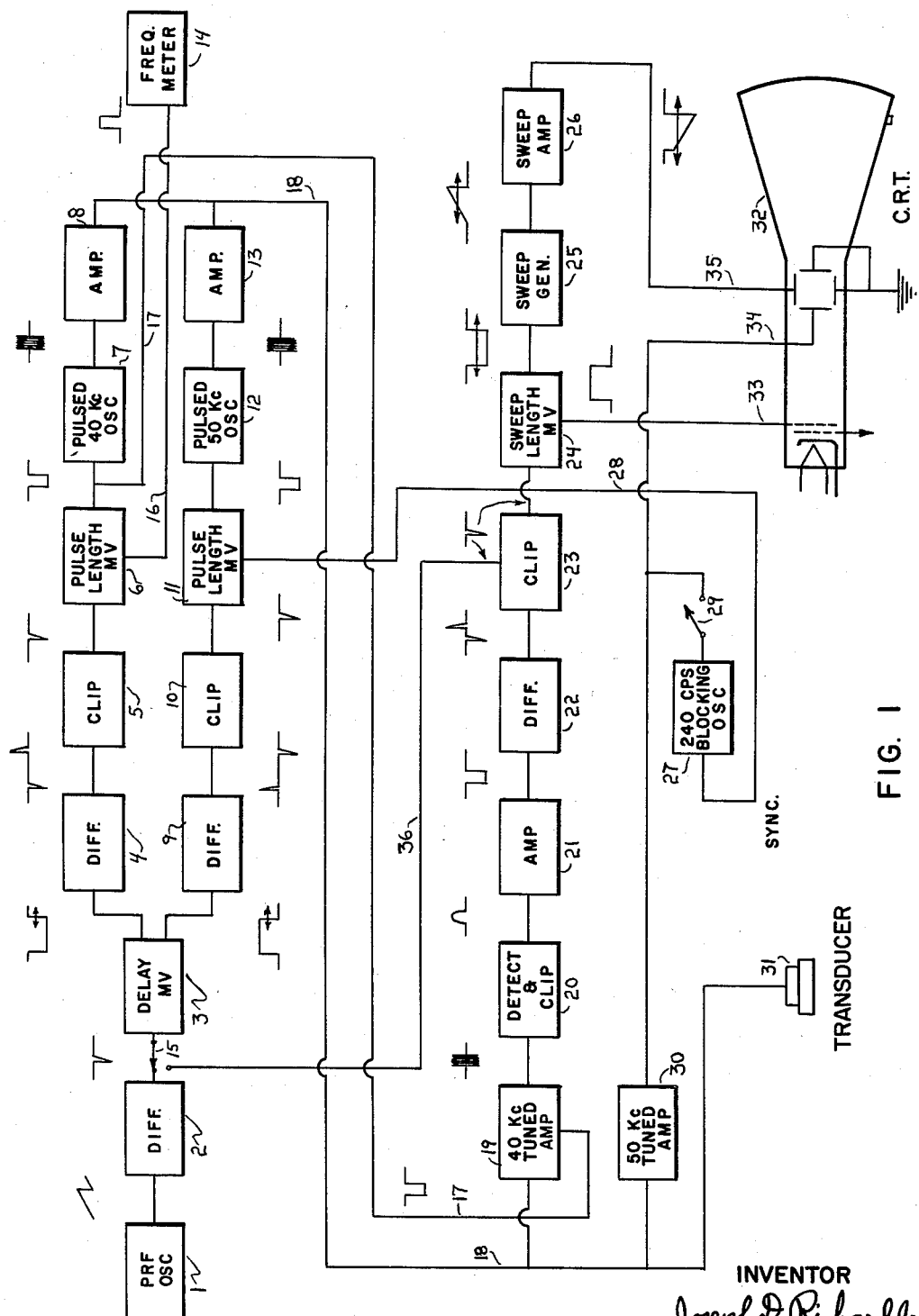
Figure 1 is a block diagram of a sonic echo ranging device embodying the principles of my invention.

Referring more specifically to Figure 1, numeral 1 represents, in block diagram, a source of a regularly recurrent waveform, which when differentiated by the RC differentiating network 2, provides triggering pulses for the monostable multivibrator 3. The monostable multivibrator 3, when triggered, provides a negative and a positive rectangular waveform the lengths of which are equal to the time duration of the quasi-stable state of the multivibrator. This time duration is readily adjustable. The negative rectangular waveform is differentiated by the R. C. circuit 4, the positive spike is clipped by diode circuit 5, and the remaining negative spike triggers the pulse length multvibrator 6. The pulse length monostable multivibrator 6 pulses the 40 kc. oscillator 7. The 40 kc. pulse is amplified by the amplifier 8 and transmitted into the water by the transducer 31. The positive rectangular waveform from the delay multivibrator 3 is differentiated by the R. C. circuit 9 and the positive spike removed by the diode circuit 10. The remaining negative spike triggers the pulse length monostable multivibrator 11. The negative rectangular waveform from the multivibrator 11 pulses the 50 kc. oscillator 12. The 50 kc. pulse is amplified by the amplifier 13 and transmitted into the water by means of the transducer 31. The elapsed time interval between the transmission of the 40 kc. pulse and the 50 kc. pulse is controlled by means of the delay multivibrator 3. The frequency meter 14 indicates the repetition frequency of the multivibrator 6. The negative waveform from the multivibrator 6 is also used to cut off the 40 kc. tuned amplifier 19 for the duration of the 40 kc. pulse. Since the 40 kc. pulse was transmitted first, the 40 kc. bottom echo will be received first. The 40 kc. bottom echo is received by the transducer 31 and amplified by means of the 40 kc. tuned amplifier 19. The amplified pulse is rectified and the negative portion clipped by means of the detector circuit 20. The positive waveform is amplified at 21 and differentiated at 22. The overdriven amplifier 21 serves to square the output waveform from the detector and clipper circuit 20. The positive spike is clipped at 23 and the negative spike used to trigger the sweep length monostable multivibrator 24. The sweep length multivibrator 24 may be adjusted to control the length of its output waveform. The sweep generator 25 provides a sawtooth sweep voltage the length of which is proportional to the length of the waveform output from the multivibrator 24. The sweep voltage is amplified at 26 and applied to the vertical deflection plate of the C. R. T. 32 by means of the connecting lead 35. The received 40 kc. bottom echo therefore triggers the C. R. T. sweep and the duration of the sweep is readily controlled by means of the sweep length multivibrator 24. The sweep is not triggered by the transmitted 40 kc. pulse because the 40 kc. tuned amplifier 19 is cut off by a negative waveform from the pulse length multivibrator 6 for the duration of the transmitted pulse. When the C. R. T. sweep is triggered by the 40 kc. bottom echo, the 50 kc. echoes which are picked up by the transducer 31, amplified by the 50 kc. tuned amplifier 30, and applied to the horizontal deflection plate of the C. R. T. 32, are displayed in their proper time sequence on the face of the C. R. T. 32. The 50 kc. echoes which are displayed are those which arrive before the 50 kc. bottom echo is received. The sweep length may be increased, however, by means of 24 so that the sweep duration is long enough to display the arrival of the 50 kc. bottom echo. The 240 C. P. S. blocking oscillator 27 provides a chain of very sharp pulses which may be introduced into the display along with the 50 kc. echo signals. The blocking oscillator pulses may be switched in by the switch 29. The leading edge of an output waveform from the pulse length multivibrator 11 triggers the blocking oscillator 27. The blocking oscillator pulses are therefore synchronized with the leading edge of each transmitted 50 kc. pulse. The sharp pulses from the blocking oscillator, when displayed on the C. R. T. 32 with the 50 kc. echoes, are used as range markers and represent range increments of 10 feet.

As an alternate method of operation, the negative spike derived from the circuit 23 may be used to trigger the delay multivibrator 3. The triggering pulses may be connected in by means of the switch 15. The overall pulse repetition rate then becomes a function of the depth since the period is simply the time duration between the transmission of the 40 kc. pulse and the received bottom echo. Since the pulse repetition rate is displayed by the frequency meter 14, the said frequency meter may therefore by calibrated to read the depth of the water.

Figure 2:
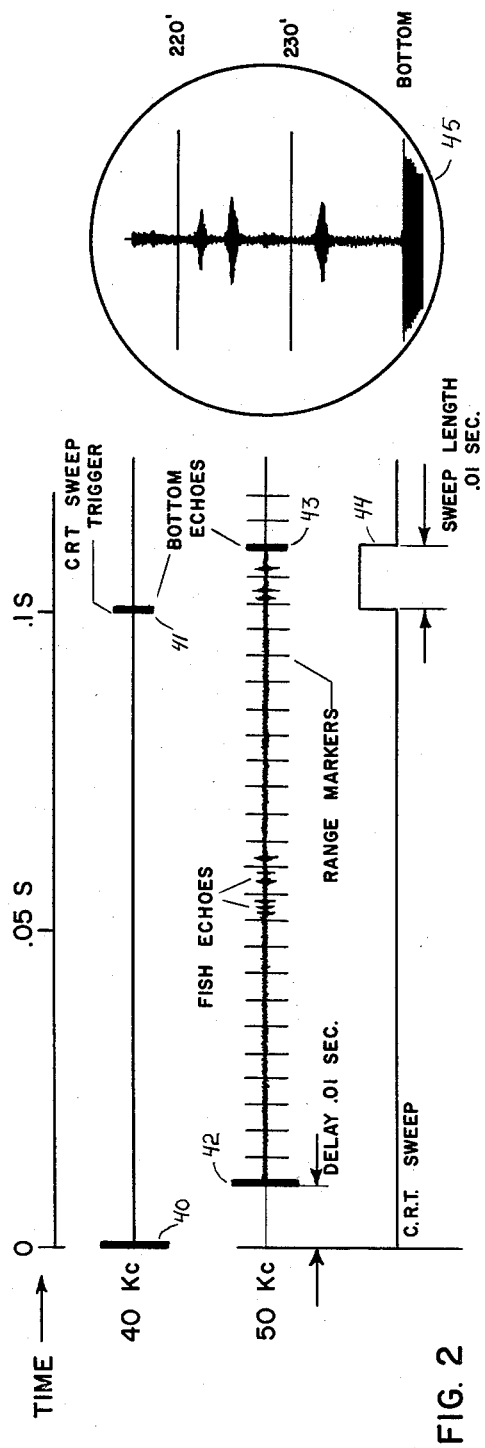
Figure 2 shows the time relationship which exists between the pair of transmitted pulses and the various resulting echoes using a given delay between pulses and a sweep length of the same duration as the delay.

Referring to Figure 2, the diagram shows the time relationship between the pair of transmitted pulses and the subsequent echoes when the depth is 240 feet, the delay is .01 second and the sweep length is also .01 second. For purposes of illustration, fish echoes are shown at ranges of approximately 110 feet and 230 feet. The rectangular waveform 44 which controls the sweep length is triggered by the 40 kc. bottom echo 41. Since the delay shown here was .01 second the C. R. T. sweep begins 24 feet above the bottom. Since the sweep length is the same as the aforementioned delay, the sweep displays a ranged section 24 feet deep. It can be seen that when the sweep length is of the same duration as the delay then the display will terminate with the 50 kc. bottom echo. The delay between the 40 kc. pulse 40 and the 50 kc. pulse 42 is controlled by means of the aforementioned delay multivibrator 3. The sweep length waveform 44 is controlled by means of the aforementioned sweep length multivibrator 24. Of the 50 kc. echoes received, only those are displayed which arrive during the period of the sweep length. The corresponding C. R. T. display is shown at 45.

Figure 3:
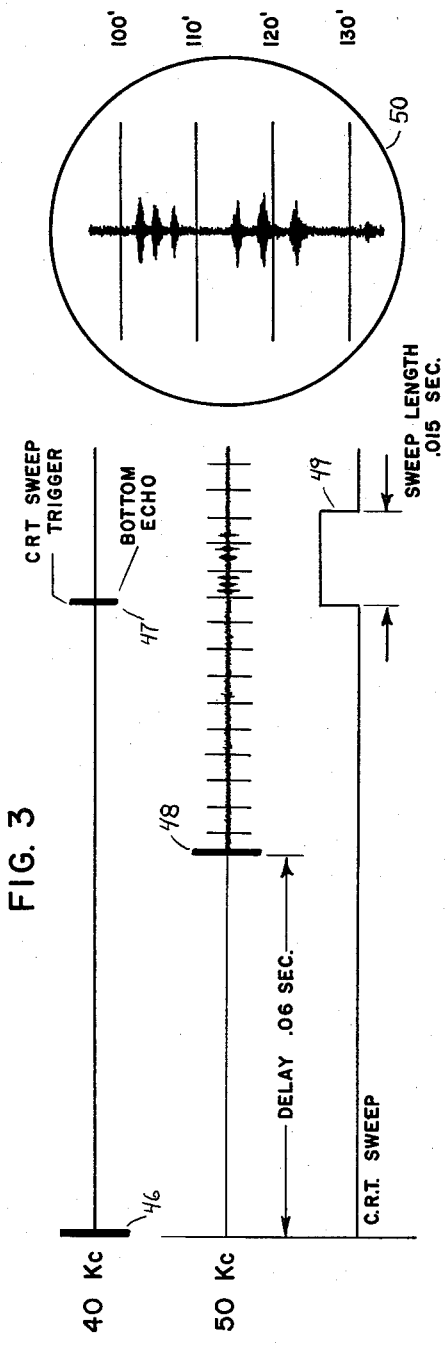
Figure 3 shows the time relationship which exists between the pair of transmitted pulses and the various resulting echoes using a longer delay between pulses and a slightly longer sweep length than those shown in Figure 2.

Referring to Figure 3, the diagram shows the time relationship between the pair of transmitted pulses and the subsequent received echoes when the depth is again 240 feet but the delay has been increased to .06 second. The sweep length has been increased to .015 second. The 40 kc. bottom echo 47 triggers the sweep length rectangular waveform 49 and a region well above the bottom is ranged and displayed on the C. R. T. As previously described the thickness of the displayed section is controlled by the length (time duration) of the sweep waveform 49. It can be readily seen that the delay multivibrator 3 controls the distance above the bottom at which the C. R. T. sweep is initiated and the sweep length multivibrator 24 controls the duration of the sweep. Any section from the surface to the bottom may be ranged and displayed on the C. R. T. by proper adjustment of these two controls.

Referring again to Figure 1, the operation of the echo ranging device will be described in more detail. The delay multivibrator 3 is periodically triggered by a pulse source. The multivibrator 3 is a monostable multivibrator and the duration of its quasi-stable state is adjustable. The utilization of monostable multivibrators to obtain rectangular waveforms of variable length for time delays is well known in the art and will not be described in detail. The 40 kc. oscillator 7 is pulsed at a time corresponding with the leading edge of the delay multivibrator 3 waveform and the 50 kc. oscillator 12 is pulsed at a time corresponding to the trailing edge of the same waveform. The length of the 40 kc. pulse is controlled by the duration of the quasi-stable state of the pulse length multivibrator 6. The 50 kc. pulse length is similarly dependent on the pulse length multivibrator 11. A 40 kc. pulse is therefore transmitted by the transducer 31 followed by a 50 kc. pulse. The elapsed time between the two pulses is controlled by the delay multivibrator 3. The frequency meter 14 indicates the pulse repetition rate of the 40 kc. pulses. A negative rectangular waveform from the pulse length multivibrator 6 blocks off the 40 kc. tuned amplifier 19 for the duration of the 40 kc. pulse. This prevents the C. R. T. sweep from being triggered by the outgoing 40 kc. pulse.

When the 40 kc. bottom echo is received, amplified, and detected, the resulting waveform is shaped into a trigger pulse which is used to trigger the C. R. T. sweep. The C. R. T. sweep is thus initiated by the 40 kc. bottom echo. The length of the C. R. T. sweep is controlled by the sweep length multivibrator which operates the sweep generator and furnishes a positive intensifier waveform to the C. R. T. control grid. The sweep generator and associated stages are completely conventional and well known to those skilled in the art. The sweep waveform is applied to the vertical deflection plate of the C. R. T. 32.

The 50 kc. echoes resulting from the transmitted 50 kc. pulse are amplified and applied to the horizontal deflection plates of the C. R. T. 32. However only those echoes are displayed which occur during the C. R. T. sweep interval. Sharp pulses generated by the 240 C. P. S. blocking oscillator 27 may also be introduced with the 50 kc. echoes. Since the blocking oscillator 27 is synchronized by the leading edge of the transmitted 50 kc. pulse, the sharp pulses, when displayed with the 50 kc. echoes, represent 10 foot range increments. The blocking oscillator frequency of 240 C. P. S. assumes a velocity of sound in water of 4800 feet per second.

In a preferred embodiment of my invention, the trigger pulse derived from the 40 kc. bottom echo is also used to trigger the delay multivibrator 3 which then initiates another pair of pulses. The pulse repetition frequency as indicated by the frequency meter 14 can then be calibrated to indicate the depths. In this manner much higher pulse repetition rates can be used (for example approximately 50 pulse per second in 50 feet of water) since the various echoes from successive pulses all arrive in their proper time sequence. Multiple bottom echoes are received in phase with primary bottom echoes and consequently cannot cause spurious triggering of the C. R. T. sweep.

Referring to Figure 3, it can be seen that with a delay of .06 second the sweep will be triggered by the 40 kc. bottom echo when the 50 kc. pulse is ranging 144 feet above the bottom. The sweep duration, which is merely an example, is .015 second which results in a C. R. T. display covering a 36 foot ranged section between 144 feet above the bottom and 108 feet above the bottom. The C. R. T. display is shown at 50. The numbers to the right identify the 10 foot increments of range and do not indicate the distance above the bottom.

As can be seen in the foregoing specifications and drawings, I have provided a method for triggering a delayed C. R. T. ranging sweep in which the target echoes displayed on successive sweeps fall at the same position on the C. R. T. screen, even though the vessel may be moving up and down on the waves relative to said targets. Although the range to the target varies between successive sweeps due to the vessel's rise and fall with the waves the displayed echoes on the C. R. T. remain fixed as long as the target maintains its position relative to the bottom. It is assumed that the vessel does not move vertically a significant amount between the transmission of the 40 kc. and the 50 kc. pulses. When ranging fish near the bottom the time interval between the pair of pulses is very short, typical values being .01 second to range down from 24 feet above the bottom and .001 second to range down from 2.4 feet above the bottom. The ranging vessel can move vertically very little during such very short time intervals. The resolution increases as the time interval between the pulse pairs decreases. The time interval between the pulse pairs is decreased as the desired ranged interval approaches the bottom. Therefore the resolution of the C. R. T. presentation increases as the selected ranged interval is made to approach the bottom. For this reason the method is particularly adapted for ranging fish or shrimp which are near the bottom. The method and apparatus described herein is also useful for locating objects on the bottom when such objects protrude somewhat above the bottom.

The particular embodiment of my invention shown in Figure 1 is merely illustrative and can be simplified considerably. The 40 kc. pulse is used only as a bottom probe which serves as part of the delay time-base and hence need not be as powerful as the actual ranging pulse at 50 kc. The bottom probe pulse ideally should be at some frequency further removed from the ranging pulse frequency. The frequencies of the pulse pairs, 40 kc. and 50 kc. are merely illustrative and actually a higher frequency ranging pulse of perhaps 80 kc. and a lower frequency bottom probe pulse of perhaps 18 kc. would be more practical for some uses such as echo ranging on small targets near the bottom.

From the foregoing description it will be readily seen that I have provided a system of echo ranging which offers wide opportunities for adaptation. Those skilled in the art will readily perceive many modifications of the above-described apparatus falling within the scope and spirit of my invention.

I claim:

1. The method of sonic echo ranging which comprises: transmitting a first sonic pulse into the water, said pulse being of a suitable frequency; initiating a time delay the beginning of which is coincident with said first sonic pulse; transmitting a second sonic pulse into the water, said second sonic pulse being initiated at the termination of said time delay and being at a frequency different from said first sonic pulse; triggering the sweep of a cathode ray tube with the received bottom echo resulting from the said first sonic pulse; and causing the swept trace of the said cathode ray tube to be deflected by the received echoes from the second of said sonic pulses.

2. The method of sonic echo ranging which comprises: transmitting a first sonic pulse into the water, said pulse being of a suitable frequency; initiating a time delay the beginning of which is coincident with said first sonic pulse; transmitting a second sonic pulse into the water, said second sonic pulse being initiated at the termination of said time delay and being at a frequency different from said first sonic pulse; triggering the sweep of a cathode ray tube with the received bottom echo resulting from the said first sonic pulse; causing the said received bottom echo resulting from the said first sonic pulse to re-initiate the aforementioned time delay and the pair of transmitted pulses, said pulse pairs thereby being transmitted periodically with a repetition rate dependent on the depth of the water; and causing the swept trace of the cathode ray tube to be deflected by the received echoes resulting from the said second sonic pulse, said echoes thereafter being periodically displayed on the face of said cathode ray tube.

3. Apparatus for sonic echo ranging comprising in combination: means for transmitting a first sonic pulse into the water; means for transmitting a second sonic pulse into the water, said second sonic pulse being of a frequency substantially different from said first sonic pulse; means for precisely controlling the time interval between said first and second transmitted sonic pulses; means for receiving echoes resulting from said first and second transmitted sonic pulse; means for triggering the sweep of a cathode ray tube with the received bottom echo resulting from said first transmitted sonic pulse; and means for deflecting the swept beam of the said cathode ray tube with the received echoes resulting from the said second transmitted sonic pulse.

4. Apparatus for sonic echo ranging comprising in combination: means for transmitting a first sonic pulse into the water; means for transmitting a second sonic pulse into the water, said second sonic pulse being of a frequency substantially different from said first sonic pulse; means for precisely controlling the time interval between said first and second transmitted sonic pulses; means for receiving echoes resulting from said first and second transmitted sonic pulses; means for triggering the sweep of a cathode ray tube with the received bottom echo resulting from said first transmitted sonic pulse; means for re-initiating the transmission of the aforementioned pair of sonic pulses by using the received bottom echo resulting from said first transmitted sonic pulse as a trigger, said pair of sonic pulses thereby being triggered periodically with a repetition rate dependent upon the depth of the water; and means for deflecting the swept beam of the said cathode ray tube with the received echoes resulting from the said second transmitted sonic pulse, said echoes thereafter being periodically displayed on the face of said cathode ray tube.

5. Apparatus for sonic echo ranging comprising in combination: means for transmitting a first sonic pulse into the water; means for transmitting a second sonic pulse into the water, said second sonic pulse being of a substantially different frequency than said first sonic pulse; means for precisely controlling the time interval between said first and second transmitted sonic pulses; means for receiving echoes resulting from said first and second transmitted pulses; means for triggering the sweep of a cathode ray tube with the received bottom echo resulting from said first transmitted sonic pulse; means for controlling the sweep duration of the said cathode ray tube; and means for deflecting the swept beam of the said cathode ray tube with the received echoes resulting from the said second transmitted sonic pulse, said echoes being thereby presented in their proper time sequence.

6. Apparatus for sonic echo ranging comprising in combination: means for transmitting a first sonic pulse into the water; means for transmitting a second sonic pulse into the water, said second sonic pulse being of a substantially different frequeny than said first sonic pulse; means for precisely controlling the time interval between said first and second transmitted sonic pulses; means for receiving echoes resulting from said first and second transmitted sonic pulses; means for triggering the sweep of a cathode ray tube with the received bottom echo resulting from said first transmitted sonic pulse; means for re-initiating the transmission of the aforementioned pair of sonic pulses by using the received bottom echo resulting from said first transmitted sonic pulse as a trigger, said pair of sonic pulses thereby being triggered periodically with a repetition rate dependent upon the depth of the water; means for indicating said repetition rate of said pair of sonic pulses, said indicating means being calibrated in terms of depth of water; and means for deflecting the swept beam of said cathode ray tube with the received echoes resulting from the said second transmitted sonic pulse, said echoes thereafter being periodically displayed on the face of said cathode ray tube.

7. Apparatus for sonic echo ranging comprising in combination: means for transmitting a first sonic pulse into the water; means for transmitting a second sonic pulse into the water, said second sonic pulse being of a frequency substantially different from said first sonic pulse; means for precisely controlling the time interval between transmission of said first and second sonic pulses; means for receiving echoes resulting from said first and second transmitted sonic pulses; means for generating timing pulses, said timing pulses being suitable to represent increments of range when an appropriate velocity of sound in water is assumed; means for synchronizing the said generated timing pulses with the said second transmitted sonic pulse; means for triggering the sweep of a cathode ray tube with the received bottom echo resulting from said first transmitted sonic pulse; means for deflecting the swept beam of said cathode ray tube with the received echoes resulting from said second transmitted sonic pulse; and means for deflecting the swept beam of said cathode ray tube with the aforementioned timing pulses, the resulting periodic deflections thereby representing increments of range.

No references cited.